March 27, 1934.  J. R. PRICE  1,952,220

INDUCTION MOTOR

Filed Aug. 27, 1931

INVENTOR
John R. Price
BY
ATTORNEYS

Patented Mar. 27, 1934

1,952,220

UNITED STATES PATENT OFFICE 1,952,220

INDUCTION MOTOR

John R. Price, Madison, Wis., assignor to Howard D. Colman, Rockford, Ill.

Application August 27, 1931, Serial No. 559,654

7 Claims. (Cl. 172—278)

This invention relates to a small induction motor having a two-pole core type stator with a single primary winding enclosing the entire section of the stator and shading coils on diametrically opposite sides of the rotor enclosing side portions of the poles and acting to cause a shifting of the magnetic field around the rotor.

Considering their small size, motors of this class possess a high output when formed with magnetic extensions of the unshaded side tips of the opposite poles projecting around and closely adjacent the rotor surface and enlarging the unshaded pole area so that a substantial amount of unshaded flux will be distributed to the rotor iron between the median plane between the poles and the shaded pole tips. In this way, a substantial area of the rotor iron not required for efficient utilization of the inherently weaker shaded field is availed of for building up the unshaded field.

Owing to the proximity of the unshaded extensions and the shaded pole tips, the use of such extensions tends to increase the leakage of unshaded flux around the rotor, that is, directly to the shaded pole tips. This leakage may be opposed and counteracted effectually by the use of shading rings of the proper low resistance.

The primary object of the present invention is to provide for additional opposition to the objectionable diversion of unshaded flux around the rotor by the magnetic extensions above referred to.

In carrying out this object, reluctance sections such for example as air gaps, are introduced in the magnetic connections between the opposite poles and so constructed and located as not to interfere with the proper distribution of the shaded and unshaded flux.

Other objects and advantages of the invention will become apparent from the following detailed description taken in connection with the accompanying drawing, in which Figure 1 is a perspective view of a motor embodying the features of the present invention.

Figure 1:
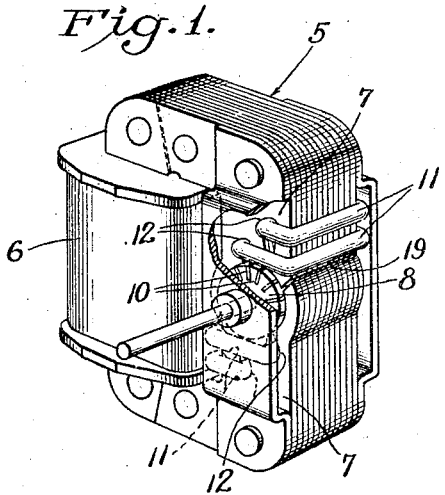

The motor shown in the drawing by way of illustration has a core type stator 5 of generally rectangular shape with one side leg enclosed by a primary winding 6. The other leg provides two opposed poles 7 having opposed concave end faces between which is located a rotor 8 of the squirrel cage type having a laminated iron core 9 in which are set a plurality of spaced inductor bars 10.

Figure 4:
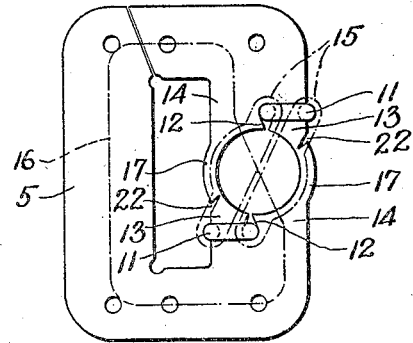
Fig. 4 is a view similar to Fig. 3 illustrating a modification of the invention.

One or more shading coils 11 are mounted on each pole 7 extending through holes 12 and enclosing side portions of the poles so as to divide the latter into diametrically opposed shaded sections 13 and unshaded sections 14. When alternating current is applied to the winding 6, current is induced in the short-circuited rings 11 producing a lagging field component which threads the rings and traverses a path represented approximately by the lines 15 (Fig. 4). Therefore the resultant flux threading the shaded sections 13 lags or comes up to its peak value later than the unshaded flux which threads the sections 14 approximately as indicated by the line 16. A resultant shifting of the magnetic field around the rotor is thereby produced as is well understood in the art.

The magnetic connections above referred to and indicated by the numerals 17 are formed, in the present instance, as integral extensions of the unshaded side tips of the poles with inner surfaces of continuous or substantially continuous iron closely following the rotor surface and constituting continuations of the unshaded pole faces proper. As above mentioned, the primary function of these connections is to distribute the predominating unshaded flux component over a large area of effective rotor iron and thus enable a larger amount of unshaded flux to be utilized in the rotor. Accordingly, the extensions are, in all forms of the invention illustrated in the drawing, made integral with the unshaded sections 14 and the iron of which the connections are composed is uninterrupted at least to the midline 18 between the poles and preferably to a point adjacent the shaded section 13 of the opposite pole. The radial width of the extensions is such that they are capable of carrying enough flux to work the rotor iron which they enclose to a high density, the preferred width being $\frac{1}{3}$ of an inch for the motor of the size shown in the drawing. The primary winding 6 and the parts of the stator are constructed to produce sufficient magneto-motive force to maintain the faces of the poles proper and of the extensions substantially at the saturation point.

Another function of the magnetic extensions of the unshaded pole tips is to reduce the reluctance of the return path of the shaded flux component. This will be apparent from Fig. 4 which shows the extensions 17 positioned in the path threaded by the shaded field component.

Owing to the fact that the pole extensions 17 form magnetic paths between the motor poles and are maintained substantially saturated, it will be apparent that the beneficial action of the connections in effecting proper distribution of the unshaded flux to the rotor iron beyond the median line 18, is offset to some extent by the increased tendency for the unshaded flux to leak directly around the rotor. Such leakage of unshaded flux is opposed by the magneto-motive force produced by the currents in the shading rings and the desired counteracting effect may be obtained in part by making the rings, particularly the small rings 11, of relatively low resistance so that correspondingly high currents will be induced therein. For the size of motor shown in the drawing, the small rings are preferably constructed to have a resistance not greater than $2 \times 10^{-4}$ ohms which would be the case when the rings are constructed of copper wire having a cross-sectional area at least equal to that of No. 12 standard copper wire.

While it would seem desirable, from the standpoint of preventing flux leakage around the rotor, to use shadings of very large cross-section, this is not the case, owing to the reduction in the strength of the shaded flux resulting from the use of rings of very large cross-section. Therefore, the present invention contemplates supplementing the counteracting effect of the shading rings in opposing flux leakage around the rotor by introducing a reluctance section in the magnetic connections between the mid-line 18 and the shaded pole tip.

In view of the inherently weaker character of the shaded component of the magnetic field, it is desirable to position these reluctance sections fairly close to the shaded pole tips. That is, the shaded area of each pole face is made sufficiently large to enable all of the available shaded flux to enter the rotor iron but leaving the remaining rotor iron between the shaded pole and the line 18 available for the unshaded flux.

The reluctance sections may take several forms. In that shown in Figs. 1 to 3, the reluctance sections are in the form of gaps 19 of air or other non-magnetic medium completely interrupting the iron between the poles and formed by slitting the stator approximately at the junction of the side edges of the poles and the outer convex surfaces of the connections 17. As shown by the lines 20 in Fig. 3, the slits 19 extend in generally radial directions rather than transversely of the shaded pole tips and preferably are inclined slightly with respect to true radii in order to enable the slits to be placed close to the shaded side tips of the poles without cutting down the shaded area of the pole faces to an objectionable degree.

Figure 2:
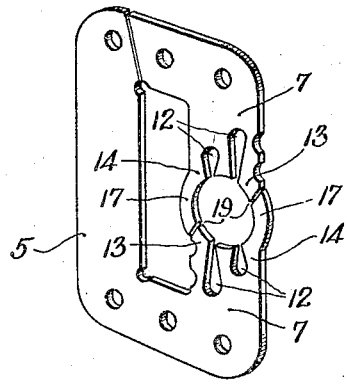
Fig. 2 is a perspective view of one of the stator laminations.
Figure 3:
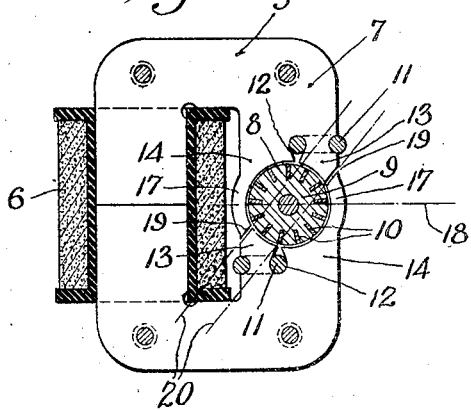
Fig. 3 is an actual size vertical sectional view of the motor shown in Fig. 1 showing a modified lamination construction.

With the gaps 19 positioned as shown in Figs. 1 to 3, maximum output of the motor is attained when the gaps are approximately .01 of an inch wide. Upon increasing the width of the gaps beyond this point, the power of the motor is decreased and when the gap is approximately $\frac{1}{32}$ of an inch wide, the power output is approximately equal to that of the same motor with the gaps omitted. Such unnecessary increase in the width of the gaps reduces the stator iron surface to which the rotor is exposed thereby decreasing the motor output accordingly.

In order that the rotor recess may be defined accurately in manufacture, it is desirable that the side tips of the opposite poles be rigidly connected. To accomplish this, the restriction forming the high reluctance section adjacent the shaded pole tip may take the form of V-shaped notch 22 (Fig. 4) whose inwardly converging side surfaces terminate short of the rotor recess thereby leaving an integral iron connection between the opposite shaded and unshaded pole tips. For maximum output of the motor, the notches should be shaped to give a reluctance equivalent in magnetic effect to an air gap .01 of an inch located as above described.

When the reluctance sections are located as above described, they act to confine the range of distribution of the shaded flux as well as to offer additional opposition to the leakage of the unshaded flux directly between the pole tips. In this way, all of the available rotor iron is utilized efficiently.

I claim as my invention:

1. An alternating current induction motor comprising a rotor of the squirrel cage type, a magnetic iron field member of the core type having poles with concave ends facing said rotor, shading coils enclosing corresponding side portions of said poles so as to divide the poles into shaded and unshaded sections, the tip of one unshaded side section being extended uninterruptedly around the rotor surface toward the adjacent pole to a point at least beyond the mid-point between the poles, and there being a reluctance section in the extension between said mid-point and the adjacent pole tip equivalent to an air gap of less than $\frac{1}{32}$ of an inch in width.

2. An alternating current induction motor comprising a rotor of the squirrel cage type, a magnetic iron field member of the core type having poles with concave ends facing said rotor, shading coils enclosing corresponding side portions of said poles so as to divide the poles into shaded and unshaded sections, the unshaded tip of one of said poles being extended uninterruptedly around and closely adjacent the rotor surface to a point adjacent the shaded tip of the adjacent pole, and there being a reluctance section between the end of each extension and the adjacent shaded tip equivalent to a radial air gap approximately .01 inches in width.

3. An alternating current induction motor comprising a rotor of the squirrel cage type, a magnetic iron field member of the core type having poles with concave ends facing said rotor, shading coils enclosing corresponding side portions of said poles so as to divide the poles into shaded and unshaded sections, and solid laminated extensions of each of said unshaded side sections projecting around said rotor closely adjacent the surface thereof and each forming a magnetic connection with the shading tip of the adjacent pole, each of said connections having a reluctance section therein adjacent the shaded pole tip acting to reduce the leakage of flux directly between the poles.

4. An alternating current induction motor comprising a rotor of the squirrel cage type, a magnetic iron field member of the core type having poles with concave ends facing said rotor, shading coils enclosing corresponding side portions of said poles so as to divide the poles into shaded and unshaded sections, and magnetic connections between the shaded and unshaded pole tips of adjacent poles, each of said connections closely following the rotor surface and having a section of high reluctance interposed therein between the shaded pole tip and the mid-point between the poles.

5. An alternating current induction motor comprising a rotor of the squirrel cage type, a magnetic iron field member of the core type having poles with concave ends facing said rotor, shading coils enclosing corresponding side portions of said poles so as to divide the poles into shaded and unshaded sections, and magnetic connections between the shaded and unshaded side tips of adjacent poles closely following the rotor surface, the reluctance of said connections at a point adjacent the shaded pole tip being greater than at any other point between the poles.

6. An alternating current induction motor comprising a rotor of the squirrel cage type, a magnetic iron field member of the core type having poles with concave ends facing said rotor, shading coils enclosing corresponding side portions of said poles so as to divide the poles into shaded and unshaded sections, magnetic connections between the shaded and unshaded side tips of the adjacent poles closely following the rotor surface, and gaps of non-magnetic media interrupting said connections at points between the shaded pole tips and the mid-point between the adjacent poles.

7. An alternating current induction motor comprising a rotor of the squirrel cage type, a magnetic iron field member of the core type having poles with concave ends facing said rotor, shading coils enclosing corresponding side portions of said poles so as to divide the poles into shaded and unshaded sections, and integral iron connections closely following the surface of the rotor between adjacent poles and rigidly joining the shaded and unshaded side tips of such poles, a portion of the iron in said connections being interrupted between the shading pole tip and the mid-point between adjacent poles to form a reluctance section acting to reduce the leakage of flux directly between the poles.

JOHN R. PRICE.